US011715275B2

(12) United States Patent
Zankowski et al.

(10) Patent No.: US 11,715,275 B2
(45) Date of Patent: *Aug. 1, 2023

(54) USER INTERFACE AND FUNCTIONS FOR VIRTUAL REALITY AND AUGMENTED REALITY

(71) Applicant: Comcast Cable Communications, LLC, Philadelphia, PA (US)

(72) Inventors: John Zankowski, Haddonfield, NJ (US); Jesse Mullen, Philadelphia, PA (US); Matthew Luther, Philadelphia, PA (US); Michael Garzarelli, Philadelphia, PA (US); Thomas Loretan, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/812,685

(22) Filed: Jul. 14, 2022

(65) Prior Publication Data

US 2022/0398819 A1 Dec. 15, 2022

Related U.S. Application Data

(63) Continuation of application No. 17/116,198, filed on Dec. 9, 2020, now Pat. No. 11,430,197, which is a
(Continued)

(51) Int. Cl.
*G06T 19/20* (2011.01)
*G06T 19/00* (2011.01)
(Continued)

(52) U.S. Cl.
CPC ............ *G06T 19/20* (2013.01); *G06F 40/106* (2020.01); *G06F 40/186* (2020.01); *G06T 19/006* (2013.01); *G06F 3/04815* (2013.01)

(58) Field of Classification Search
None
See application file for complete search history.

(56) References Cited

U.S. PATENT DOCUMENTS 9,030,467 B2 5/2015 Hwang
9,035,939 B2 5/2015 Martinez et al.
(Continued)

OTHER PUBLICATIONS

Bell et al., "View Management for Virtual and Augmented Reality", VIST, 2001.
(Continued)

*Primary Examiner* — Nicholas R Wilson
(74) *Attorney, Agent, or Firm* — BakerHostetler

(57) ABSTRACT

Systems and methods are described to enable the creation of user interfaces that may adapt to different environments and may be automatically created. User interfaces may be two-dimensional or three-dimensional and may be used in virtual reality or augmented reality applications. An interface creator may create or receive digital assets associated with a content item, define virtual planes and associated digital asset templates, associate the digital assets with the virtual planes, and enable display of the virtual planes with associated digital assets to a user for user interaction. Digital assets may be automatically edited to meet the specifications of the templates associated with the virtual planes. Virtual planes and templates may also be standardized and aggregated so that a completed user interface may be easily delivered and presented with other content items in a uniform manner.

20 Claims, 9 Drawing Sheets

Related U.S. Application Data continuation of application No. 15/784,767, filed on Oct. 16, 2017, now Pat. No. 10,891,803.

(51) Int. Cl.
    *G06F 40/106*    (2020.01)
    *G06F 40/186*    (2020.01)
    *G06F 3/04815*    (2022.01)

(56) References Cited

U.S. PATENT DOCUMENTS

| | | |
|---|---|---|
| 9,043,007 B2 | 5/2015 | Jensen et al. |
| 9,247,303 B2 | 1/2016 | Phang et al. |
| 2011/0274361 A1 | 11/2011 | Bovik et al. |
| 2013/0229406 A1 | 9/2013 | Elyada et al. |
| 2013/0318479 A1 | 11/2013 | Porwal |
| 2014/0098102 A1 | 4/2014 | Raffle et al. |
| 2014/0306938 A1 | 10/2014 | Block et al. |
| 2015/0235408 A1 | 8/2015 | Gross et al. |
| 2016/0379418 A1 | 12/2016 | Osborn et al. |
| 2017/0302903 A1 | 10/2017 | Ng et al. |

OTHER PUBLICATIONS

Richard A. Ainsworth et al., Acquisition of stereo panoramas for display in VR environments, Three-Dimensiona Imaging, Interaction, and Measurement, 2011, vol. 7864, SPIE.
Toyama et al., "VRowser—A Virtual Reality Parallel Web Browser", Springer, 2018. (Year: 2018).
U.S. Appl. No., filed Dec. 9, 2020, entitled "User Interface and Functions for Virtual Reality and Augmented Reality", U.S. Appl. No. 17/116,198.

USER INTERFACE AND FUNCTIONS FOR VIRTUAL REALITY AND AUGMENTED REALITY

CROSS REFERENCE TO RELATED APPLICATIONS

This application is a continuation application of U.S. patent application Ser. No. 17/116,198, filed Dec. 9, 2020, which is a continuation application of U.S. patent application Ser. No. 15/784,767, filed Oct. 16, 2017, now U.S. Pat. No. 10,891,803, each of which is hereby incorporated by reference in their entirety.

BACKGROUND

User interfaces enable human-computer interaction. A user interface may aggregate content in a generic fashion, such as a TV channel guide, which simply lists available content. Separate interfaces may be created for different types of devices used to access content. Emerging technologies related to virtual reality and augmented reality content present new challenges for constructing, presenting and using interfaces.

SUMMARY

Existing virtual reality and augmented reality user interfaces are custom built for content to which they allow access. Interfaces are needed, for example, for users and creators and others to initiate and navigate content, interact with content, discover what is available in the content and related resources, communicate with other users and entities, etc. Custom building of user interfaces creates additional overhead for a content distributor, which may add extra expenses and delays. For example, if a movie-streaming service requires a virtual reality or augmented reality interface to be created before the service will host a movie, extra work will be needed by the content provider to build a three-dimensional environment and interface for the movie. The extra work adds to the cost associated with the movie and may delay the release of the movie on the streaming service until the interface is completed. Further, the movie may be distributed on services that have both two-dimensional and three-dimensional interfaces, requiring additional interfaces with extra work and possible additional delays.

Systems and methods are described to enable the creation of user interfaces that, in one aspect, may adapt to different environments and may be automatically created. An interface creator may create or receive digital assets associated with a content item, define virtual planes and associated digital asset templates, associate the digital assets with the virtual planes, and enable display of the virtual planes with associated digital assets to the user for user interaction. In another aspect, digital assets may be created to enable them to be automatically edited to meet the specifications of the templates associated with the virtual planes. In yet another aspect, virtual planes and templates may be standardized so that a completed user interface may be easily sent to a content aggregator to present the content item with other content items in a uniform manner.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. In the drawings.

DETAILED DESCRIPTION

Figure 1:
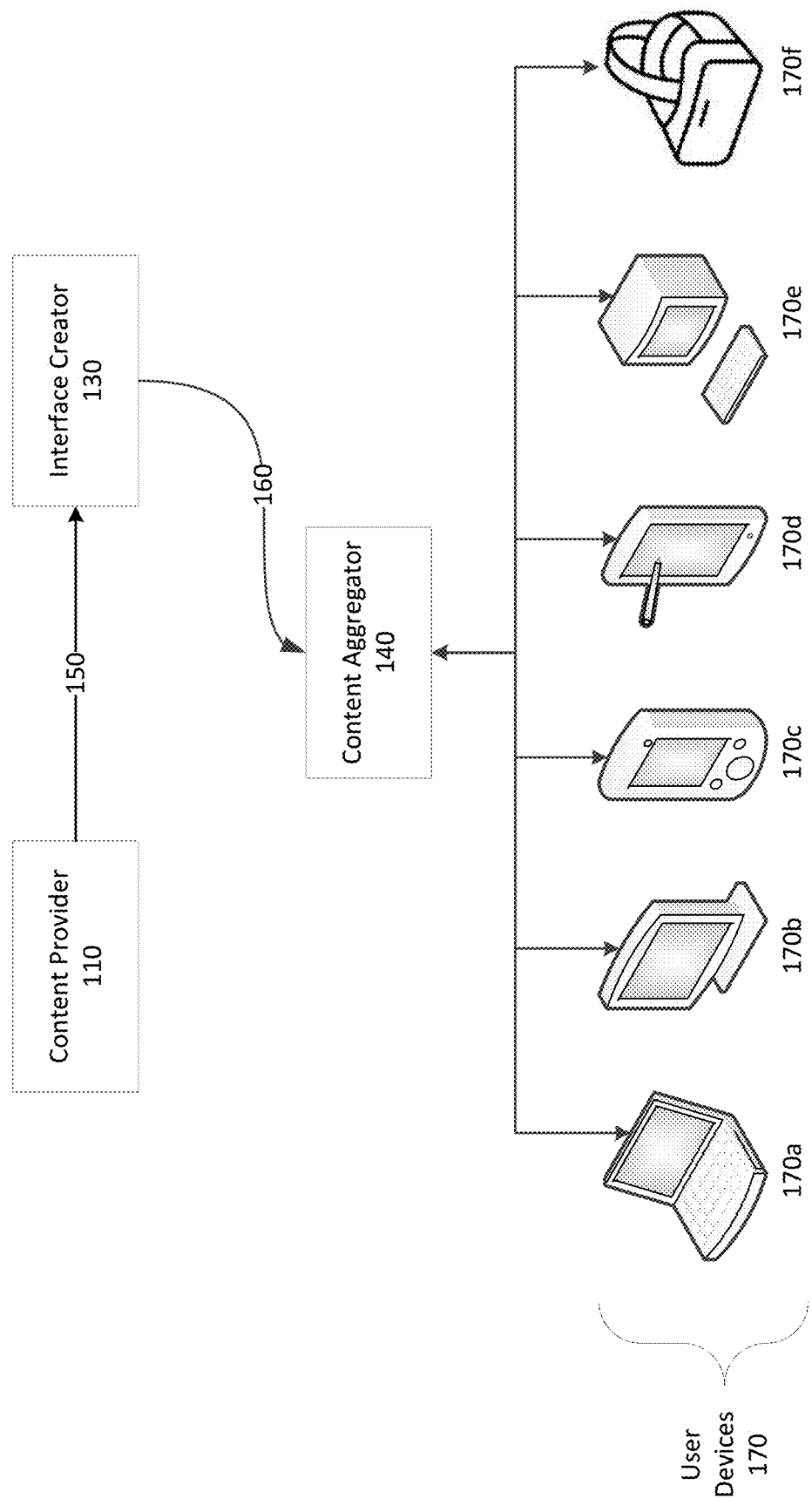
FIG. 1 depicts an example network of entities involved in the creation and display of a user interface.

A myriad of content is consumed on a daily basis. Articles, blogs, and documents are read; television shows and movies are watched; books are both read and heard; video games are played; software is executed. Much of consumed content is consumed via smartphones, laptops, desktops, tablets, game consoles, and other computer systems, typically involving use of the Internet or other computer network.

For a user to consume content on a computer system, the content must have an associated user interface. A user interface allows a user to interact with the content in some way, typically by inputting a command. For example, a user interface for a video streaming service may allow a user to search and navigate a library of videos and then select a video of his or her choosing to watch. Then, during playback, the user may or may not be able to perform various actions such as pause, play, rewind, and fast-forward. Generally, a user interface on a computer system may use any viable method of input compatible with the system, such as pushing buttons on a remote control or game controller, voice commands, touch gestures, body gestures, keyboard or mouse commands, or any other method of human-computer interaction that allows a user to access or manipulate data on the computer system.

Virtual reality (VR) leverages three-dimensional (3D) environments to immerse a user in a virtual world. A 3D virtual computer environment is first created, and users typically don specialized computer eyewear to immerse themselves in the environment. Once immersed in the environment, a user may look around as if he is physically inside it. For example, the user may typically look 360 degrees in every direction to view the environment. In some cases, the user may also walk around the environment by walking in physical reality, which may or may not take place on a treadmill or other contained apparatus a user may move in or on.

Augmented reality (AR) is similar in concept to virtual reality in that it involves virtual objects projected to a user's visual field; however, these virtual objects are projected into the user's current real physical environment. For example, a user may hold up his mobile phone camera view and see a 3D virtual object added to the screen image, such as a rendering of a completed building at a construction site. In another example, a user may wear specialized computer eyewear that adds virtual projections to the physical environment, such as a news channel being broadcast on a wall as if a television was present, or video game characters on a user's coffee table that the user may manipulate.

User interfaces for VR and AR typically allow interactions via body gestures, voice commands, and button commands, which may be available via controllers, microphones, environmental sensors, or any other viable input apparatuses. For example, a user may physically move his head in a specific direction to view a virtual object or scroll through a list of virtual objects; a similar action may be performed by one or more joysticks or directional-pads on a controller or headset. To select such a virtual object, a user may speak "select" or another command that indicates to the computer system that the user would like to select the object, or the user may press a button on a remote control, the VR or AR headset, or other controller to select a desired object.

Systems and methods are described enabling the creation of user interfaces that may be automatically created and may adapt to different computer environments. An interface creator may receive digital assets associated with a content item, define virtual planes and associated digital asset templates for displaying digital assets, associate the digital assets with the virtual planes, and display, or output for display, the virtual planes with associated digital assets to the user for user interaction. Digital assets may be automatically edited to meet the specifications of the templates associated with the virtual planes. Virtual planes and templates may be standardized so that a completed user interface may be easily sent to a content aggregator to present the content item with other content items in a uniform manner.

FIG. 1 illustrates an example system using embodiments described herein. The example entities of FIG. 1 may be part of or use a computer network, which may be a small, home network or part of a large network such as the Internet, or a combination of both. Alternatively, the entities of FIG. 1 may be part of a single computer system.

The content provider 110 may be used by a provider of consumable content, such as a media company or other source of content requiring a user interface. For example, the content provider 110 may be used by a TV or movie studio, a video game company, a software developer, or even a single user. The content provider 110 is communicatively connected to an interface creator 130 via connection 150, as shown in FIG. 1. The content provider 110 transmits digital assets to the interface creator 130. Digital assets may be entities the user of the content provider 110 wishes to include in a user interface associated with its content item. For example, a digital asset may be an image from the content item, a three-dimensional (3D) virtual object associated with the content item, a snippet of the content item's video, etc.

The interface creator 130 receives digital assets and uses them to create automatically, or to help a user create, one or more user interfaces to be associated with content provided by the content provider 110. The interface creator 130 may create two-dimensional (2D) or 3D interfaces for use with a variety of devices, such as the user devices 170. A method for user interface creation is described in more detail below. After the interface creator 130 creates the user interfaces based on the received digital assets, it sends the interfaces to a content aggregator 140 via connection 160 to be consumed by users, as shown in FIG. 1.

The content aggregator 140 may be a user-facing provider of media services, such as software used by a cable company or streaming service, which may aggregate content from several sources into a single source point for a customer. The content aggregator 140 may deliver content via a set top box, the Internet, a local hard drive, or any other viable method of delivering content to a user. As shown in FIG. 1, a user may access content via a laptop 170a, a television 170b, a smartphone 170c, a tablet 170d, a desktop 170e, a VR headset 170f, or any other device capable of presenting content to a user. The content aggregator 140 presents user interfaces to enable users to access the content to which it providers. The interfaces may be viewed by scrolling, zooming, or any other interaction mechanism that allows a user to view the content items of the content aggregator 140.

The content provider 110, the interface creator 140, and the content aggregator 140 may be physical or digital and take any suitable form for their described purposes. For example, they may take the form of software components on one or more computers or modules within a single software suite. The connections 150 and 160 may be physical connections, such as those via hardware circuits or LAN cables, wireless connections, such as those via WiFi or cellular, or any other suitable communicative connection. In an example, the content provider 110 is used by a media company that creates digital assets relating to a media product, such as a digital 3D spaceship that corresponds to a spaceship in a TV show. The content provider 110 sends a digital representation of that spaceship to an interface creator 130 via the connection 150. In an example, the digital representation of the 3D spaceship may be sent via email, and the connection 150 may be an Internet connection. The interface creator 130 receives the 3D spaceship and may create a user interface featuring the 3D spaceship, which it then sends to the content aggregator 140. The created interface may be stored in a digital file and sent via email through the connection 160 to the content aggregator 140; the connection 160 may also be an Internet connection. The content aggregator 140 receives the created user interface and may store it for display, or output for display, to users accessing the content aggregator 140 and attempting to access the TV show or information about the TV show.

In another example, the content provider 110, the interface creator 140, and the content aggregator 140 may be software programs or software modules on a single computer. A user of this computer may create content with or open content with the content provider 110. Such content may be a home movie, a video game, or other content that may require a user interface. The user may use the content provider 110 to create digital assets for use in the user interface. The user may then send the digital assets to an interface creator 130 to create a user interface using the digital assets. In this example, the connection 150 may be a hardware circuit on the computer, such as a bus. After the interface is created, it may be joined via connection 160 with the user-created content in a content aggregator 140, which the user may then access from the computer or other device capable of accessing the content; the connection 160 may also be a hardware circuit on the computer.

An interface creator 130 may receive one or more digital assets and may automatically create one or more user interfaces using the digital assets. The interface may be manually altered after creation. A user interface may be 2D or 3D and may have the ability to dynamically adapt dimensions to a user device accessing the user interface. For example, a user interface may be created for use in a 3D VR environment, but may be viewed as a 2D interface from a smartphone, TV, or computer. The digital assets the interface creator 130 receives may be interactive and may allow the user to select or manipulate them. For example, a user may select an image to begin playback of a movie or select a 3D computer model to view.

A user interface may comprise one or more layers. Layers may comprise or contain one or more digital assets, may be of any geometrical shape, and may be situated on various virtual planes in a 3D environment. A virtual plane of a user interface is a defined area with a depth attribute used to create depth of field for a user experiencing the user interface in 3D. For example, a virtual plane in a 3D environment may be defined as "all coordinates with a perceived depth of two feet away from the user," which would comprise a sphere of coordinates. When viewing a 3D user interface in a 2D environment, layers may be flattened so that they appear to be on a single virtual plane. Some 2D environments may retain one or more properties of multiple virtual planes, such as a parallax effect when scrolling or moving a device.

Figure 2:
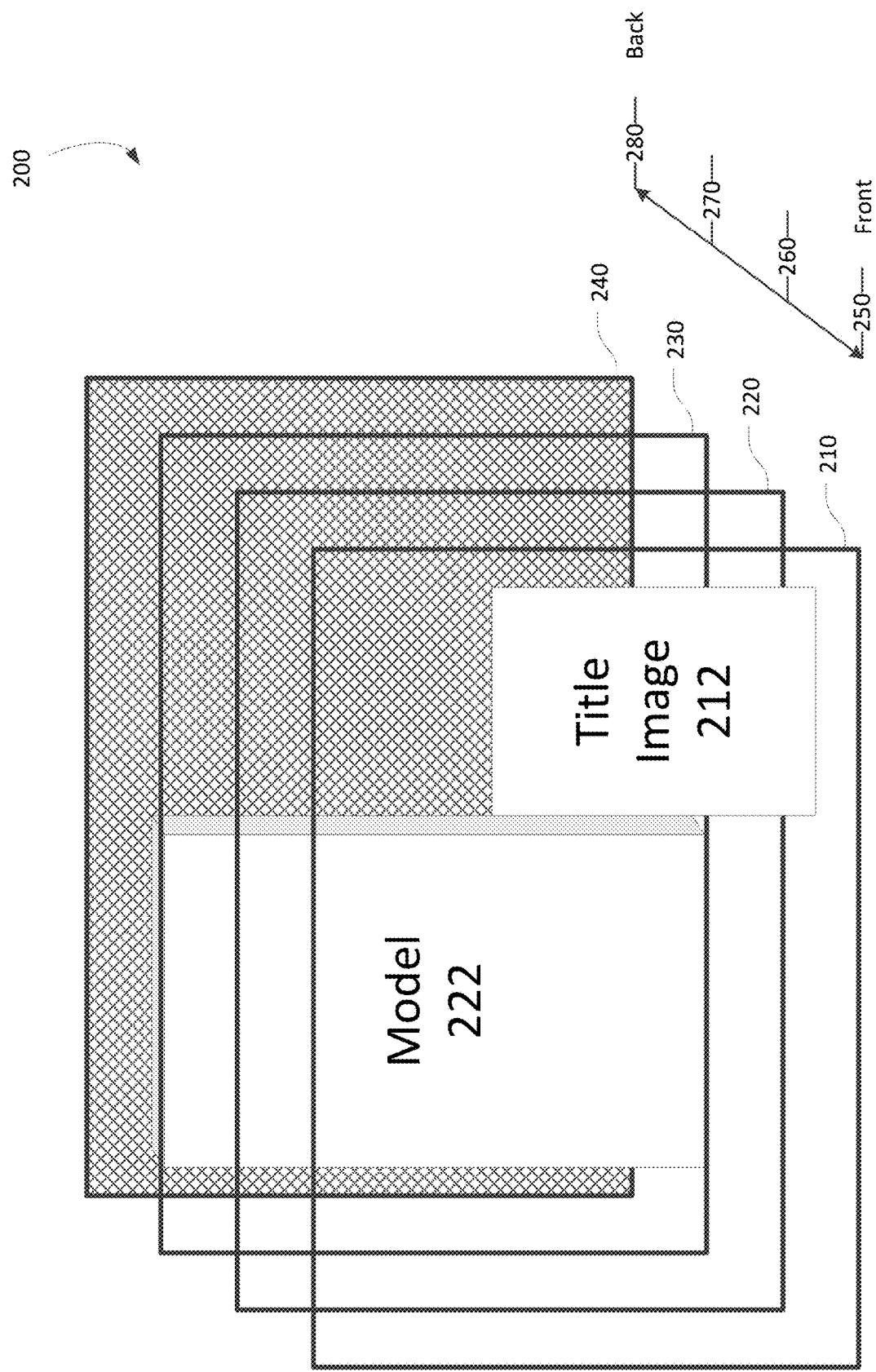
FIG. 2 illustrates an example 3D user interface.

FIG. 2 illustrates an example 3D environment 200 comprising the layers 210, 220, 230, and 240 situated on the virtual planes 250, 260, 270, and 280, respectively. The layer 210 may comprise a transparent background and may contain a digital asset, such as, for example, the Title Image 212. The title image 212 may be cover art or a poster for a movie or TV show, which identifies the associated content to a user. The layer 220 may comprise a transparent background and may not currently contain any digital assets, but may contain digital assets received at a future time. The layer 230 may also comprise a transparent background and contain a digital asset, such as the Model 222. The model 222 may be a 3D computer model associated with the content for which the user interface is intended to be used, such as the 3D spaceship example described above. The layer 240 may contain a background pattern to accent the user interface.

To create a user interface for a content item, the interface creator 130 may receive one or more digital assets associated with that content item from the content provider 110 supplying the content item. The digital assets may have associated metadata that allows the interface creator 130 to automatically determine where the digital assets should be placed in the interface. For example, the content provider 110 may send a title image, such as the title image 212, having metadata that allows the interface creator 130 to determine the title image should be located closest to the user in the user interface; this process may be as simple as sending an email with the digital asset and the word "title" or "front," using XML tags, or using any other viable method of associating metadata with a digital asset. The interface creator 130 may also have an Application Programming Interface (API) that a content provider 110 may use to send digital assets and group or classify the digital assets into sections of the desired user interface. For example, a method of the API may allow the content provider 110 to place the title image 212 in the front of the user interface without sending metadata with the title image 212. In an example, the interface creator 130 may operate in accordance with a known configuration, as described below, and digital assets may include metadata from the content provider 110 to indicate where they should be placed in the configuration.

The interface creator 130 may already have access to digital assets of a content item from previous transactions or interfaces. For example, a user interface or an advertisement may have been created previously for a content item available via the content aggregator 140, and digital assets from that previous work may be available to the interface creator 130. Again, such digital assets may use associated metadata, an API, or user intervention to place them in a position in a user interface.

Further, the interface creator 130 may have generic digital assets that may be used on any user interface, such as ambient effects or stock images and environments. For example, a content provider 110 may wish to include ambient effects in a user interface, such as fog, fire, weather, etc. These effects may be available for selection from the interface creator 130. A content provider may also wish to populate a 3D environment with a generic image or environment, such as one in space, on a mountaintop, in the desert, or simply a background pattern, such as that shown in FIG. 2 and FIG. 3, described below.

The interface creator 130 may also leverage interactive digital assets. For example, a user interface connected to a network such as the Internet may include one or more social media feeds containing recent posts about the associated content item. In an example, the user interface may also include one or more interactive elements that allow a user to direct the content item, such as a "choose your own adventure" feature that may change the outcome of a story, a feature that allows a user to interact with story protagonists, or any other feature allowing user manipulation of a content item.

The interface creator 130 may define virtual planes based on a default configuration scheme, the number of digital assets it receives, or a user-defined scheme. For example, if the interface creator 130 receives two digital assets, such as a title image 212 and a model 222, the interface creator 130 may define two virtual planes, such as the virtual planes 250 and 270, to create depth in the user interface. Alternatively, the interface creator 130 may define any number of virtual planes based on a default configuration scheme regardless of the number of digital assets received, such as defining the four virtual planes 250, 260, 270, and 280, as shown in FIG. 2, even though they may lack digital assets. A content provider 110 or user may also define virtual planes manually.

Each virtual plane may contain a layer, which may comprise or contain digital assets. A layer may take the form of any geometrical shape and may contain any number of digital assets. For example, the layer 210 in FIG. 2 is rectangular, shown by its outline, and contains the title image 212. The layers 220, 230, and 240 are also rectangular; the layer 230 contains the model 222, and the layer 240 contains a background pattern. If displayed in a 2D environment, the layers 210, 220, 230, and 240 may be shown flattened into a single layer 210, where the single layer 210 may contain the title image 212, the model 222, and the background pattern of the layer 240, as shown in FIG. 3.

Figure 3:
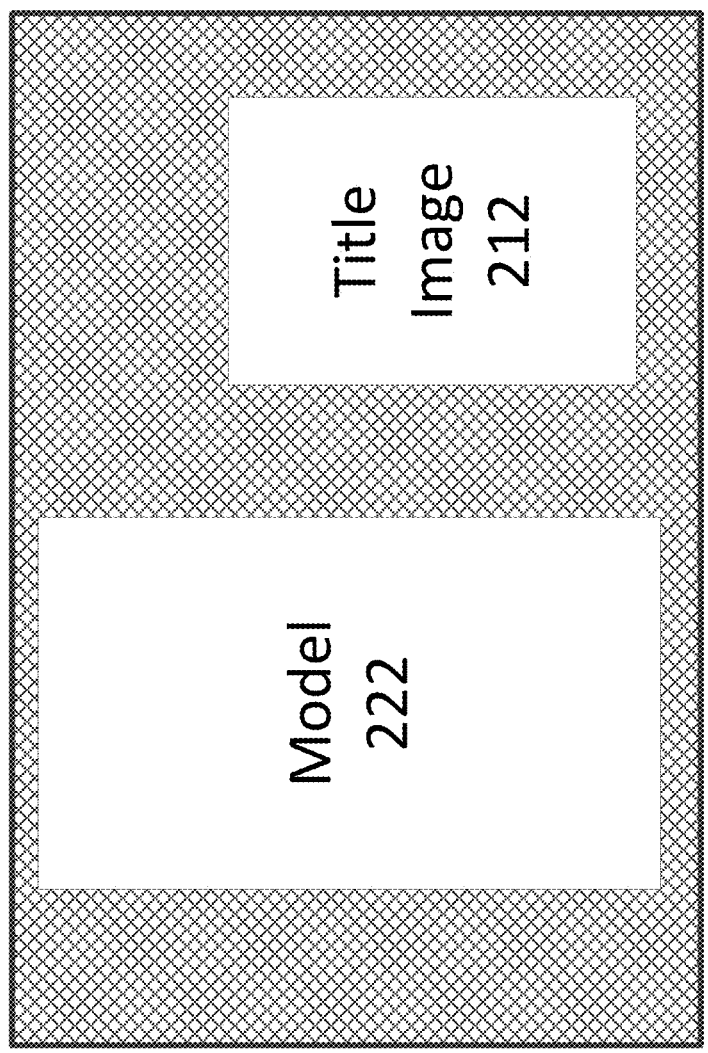
FIG. 3 illustrates the 3D user interface of FIG. 2 displayed in a 2D environment.

FIG. 3 illustrates an example front view of the layers 210, 220, 230, and 240, displaying the title image 212 and the model 222. In a 2D environment, this user interface may appear to comprise a single layer on virtual plane 250, as it does in FIG. 3, even though the digital assets 212 and 222 are contained on separate layers 210 and 220, respectively. However, the user interface may retain some perceived depth. The model 222 appears smaller in FIG. 3 than it does in FIG. 2 because of the difference in depth between the virtual planes 250 and 270. The user interface may also have a parallax effect when tilting or scrolling a user device the interface is displayed, or output for display, on, making the interface appear to have depth from the virtual planes 250 and 270. In a 3D environment, a user may be able to zoom in on or around the title image 212 or model 222 and freely traverse the environment 200 to view and interact with the user interface.

As with virtual planes, each layer may be defined based on a default configuration scheme, the number of digital assets the interface creator 130 receives, or may be user created. Layers may also be defined by the virtual planes that will contain them. For example, there are four virtual planes in FIG. 2, the virtual planes 250, 260, 270, and 280, and each has a respective layer, illustrated by the layers 210, 220, 230, and 240.

Each layer or virtual plane may have an associated template. The template may determine how digital assets are displayed, or output for display. For example, a template may require a digital asset to be a certain size or may only show a certain area of the digital asset that falls within the template if the digital asset is too large. Alternatively, the interface creator 130 may automatically crop or resize a digital asset, or a user of the interface creator 130 may crop or resize a digital asset, to fit a template. The interface creator 130 may make its templates available to a content provider 110 to ensure that the content provider 110 may supply the interface creator 130 with digital assets that fit the templates if a user of the content provider 110 so desires. Alternatively, the content provider 110 may create the templates, and other portions of the interface, together with the digital assets.

Figure 4:
FIG. 4 illustrates an example template of a layer.

An example template may be seen in FIG. 4. The template 400 shows the visible area 410 of a layer it is associated with, which may be a layer such as the layer 210 of FIG. 2. The layer bounds are the outer rectangle, and the template shows that the left side of the layer is a reserved transparent area 420, and the right side of the layer is a visible area 410 where a digital asset may be viewed. If a digital asset extends beyond the visible area 410, it may be automatically, or manually, cropped or resized to fit within the visible area 410. Alternatively, the template 400 may be associated with a virtual plane, such as virtual plane 250, and obviate the need for a layer to be defined. In such a case, the template 400 would define the rectangular shape shown in FIG. 4, as well as the visible area 410 and the reserved transparent area 420.

A template may comprise one or more bounds for a size of a digital asset, which may require editing the digital asset to fit within the one or more bounds. For example, a digital asset may be enlarged and/or cropped to fit within the one or more bounds. In an example, if the interface creator 130 receives small images or is using older images, it may enlarge them to match a standard user interface design. An enlarged digital asset, such as an image, may keep its dimensional ratios, such as width-height-depth ratios, and may not fit inside the area defined by the template. In such a case, the enlarged digital asset may be sized to fit one or more dimensions of the template and may be cropped in accordance with the template. For example, if a template has a 16×9 width-height ratio and the supplied image is small and has a 4×3 width-height ratio, the enlarged 4×3 image will not fit the exact 16×9 ratio of the template. So, the 4×3 image may be resized to match the height or the width of the template, or the image may be resized to be larger than both dimensions. The image may then be cropped in accordance with the template, which may indicate cropping of the image to fit the outer dimensions of the template or may indicate cropping within smaller dimensions of the template, as shown in the example template and cropping of enlarged image 520 in FIG. 5, below. If the image is resized to match the height of the template, there will be extra width on the template that needs to be accounted for. If the image is resized to fit the width of the template, the image height will be larger than that of the template, necessitating a crop from the top and or bottom of the enlarged image.

Enlarging a digital asset may distort it if it does not have adequate pixel or polygon density. Distortion may result in a poor user experience. Such distortion may be determined automatically via any feasible method, such as sampling portions of the image or comparing the original dimensions of the digital asset to the new dimensions of the digital asset. To account for distortion, the interface creator 130 may apply degrading techniques to the digital asset, such as blurring, adding border colors or gradients, or any other technique that may disguise distortion from a user. For example, an enlarged image may become pixelated and cropped to an extent that a user may see only large boxes of color and vague outlines of the subjects of the image. In response to such distortion, the interface creator 130 may apply a blurring, such as a Gaussian blur, to the image to smooth the pixel edges and create an impression of the original image and its color. Degrading techniques may be automatically determined by the interface creator and may be attributes of a template. For example, a template may comprise one or more attributes indicating that degrading, such as blurring, should occur between specified dimensions of a digital asset.

Figure 5:
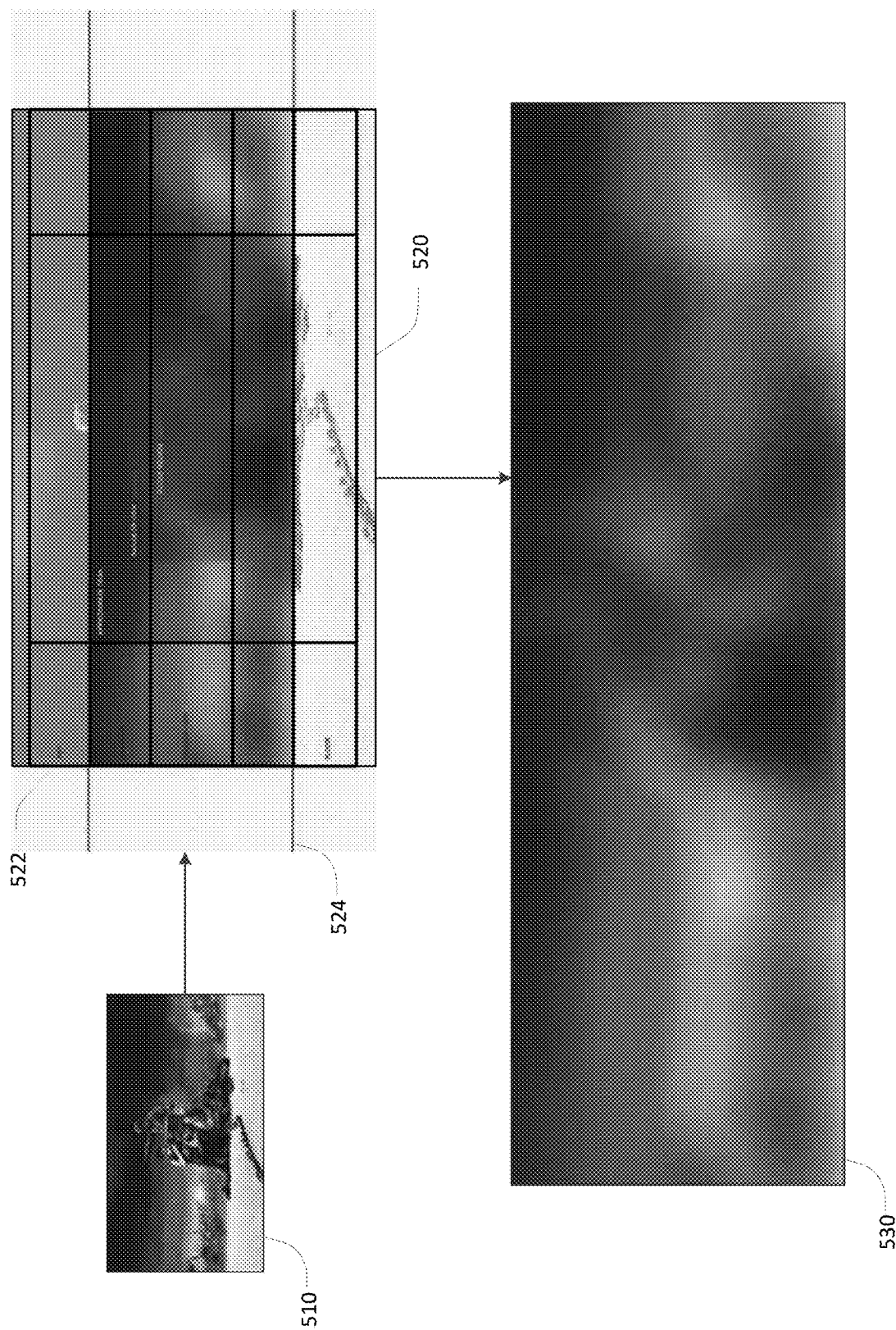
FIG. 5 illustrates an example process of enlarging and degrading an image.

FIG. 5 illustrates an example process of enlarging and degrading an image. In the example process of FIG. 5, an original image 510 is being enlarged for use in a user interface. The original image 510 may be used as any type of digital asset in the user interface, as described herein. As shown in FIG. 5, the original image 510 may be small; specifically, the original image 510 may be too small for use in the user interface. So, the original image 510 may be enlarged to create an enlarged image 520 for use in the user interface. The original image 510 may be enlarged to fit a template, such as the template 522 indicated by the lines superimposed on the enlarged image 520. Such a template 522 may be any suitable template for use in creating a user interface and should not be construed as limiting. In this example, the template 522 indicates a desired size of the enlarged image 520 by indicating a maximum width and height of the enlarged image 520 and also indicating cropping lines 524, indicated as lines extending from the template 522. The original image 510 may be automatically enlarged to fit a dimension of the template 522. In the example shown in FIG. 5, the original image 510 was enlarged to fit the width of the template 522, resulting in the height of the enlarged image 520 extending beyond the template 522. The original image 510 may not have adequate pixel density to remain usable when enlarged. So, the enlarged image 520 may be distorted. Distortion may be determined automatically, as described above. To account for such distortion, an interface creator, such as the interface creator 130, may automatically apply degrading techniques to the enlarged image 520, which may or may not be determined by attributes of the template 522. As shown in FIG. 5, a blur was applied to the enlarged image 520 between the cropping lines 524 of the template 522. After the degrading techniques have been applied, the enlarged image 520 may be automatically cropped, as indicated by cropping lines 524 of the template 522. The final image 530 may now be usable by the user interface. While the final image 530 may not convey all of the information of the original image 510, the final image 530 may convey an impression of the original image 510.

Border colors or gradients may be used to disguise digital asset seams and distortion. For example, a user interface may use a solid color or pattern as a background, which may expand or contract depending on the type of device a user is employing, such as a background of stars in space, and a non-black or non-space image may be placed on this background. The edges of the image may create distinct seams, such as a rectangle, with the background in an undesirable manner. To combat this effect, a gradient effect may be used around the edges of the image to create a gentler transition from the image to the background and may also serve to cover distortion in the image. For example, for a colorful rectangular image on a black background, a rectangular gradient transitioning the colors of the image to black may be used to cover the top seam to unify the image with the background. A similar gradient may be used on the bottom seam, the side seams, or in any pattern that blends the image into the background. While slightly less of the image may be shown, the image will appear seamless with the background and enhance user immersion.

Figure 6:
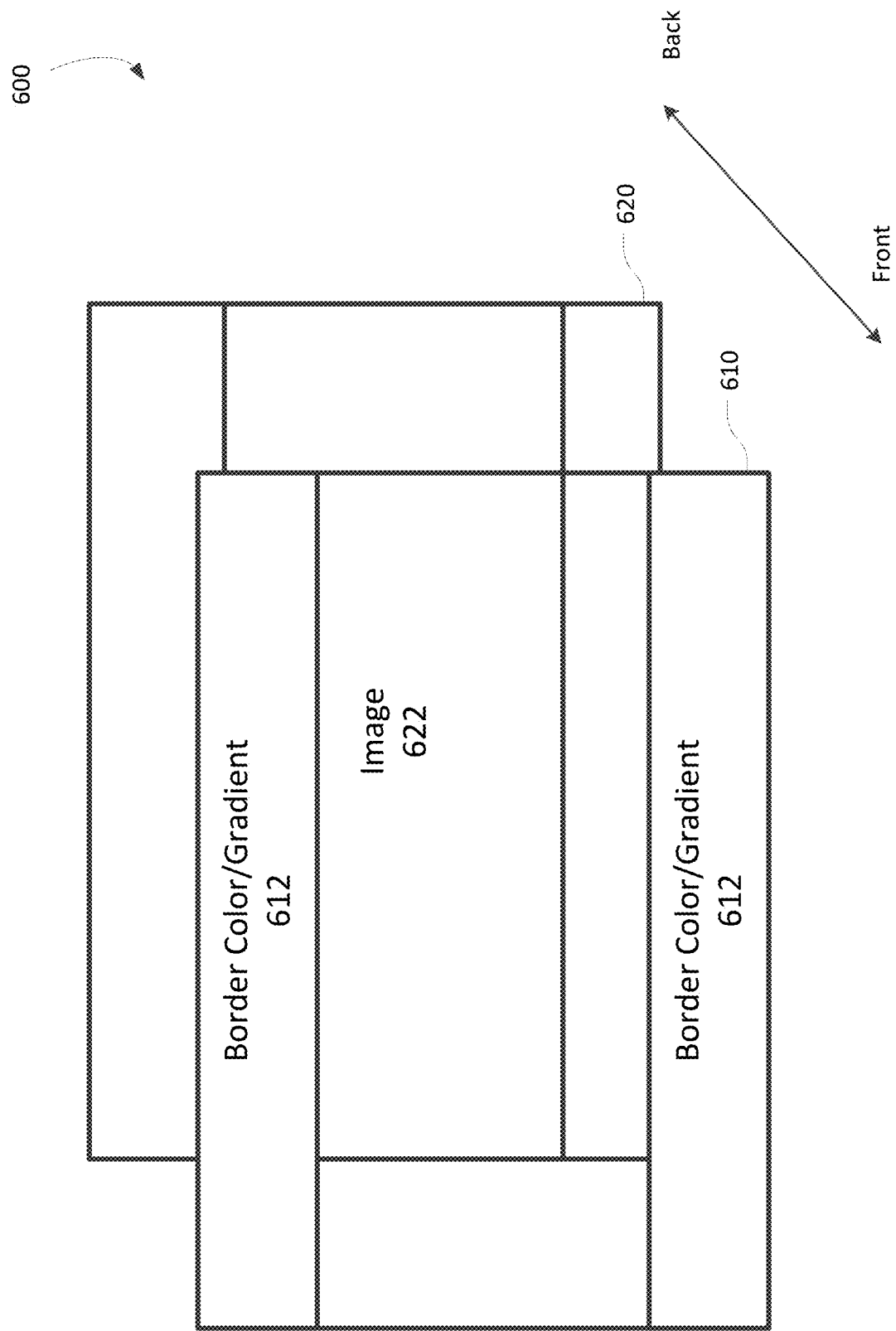
FIG. 6 illustrates an example of a border color or gradient being added to a user interface.

FIG. 6 illustrates an example of a border color or gradient 612 for an image 622 being added to a user interface 600. For example, the border color or gradient 612 may be used to disguise portions of an image or better transition the edges of the image to a background. In FIG. 6, layer 620 contains an image 622. The image 622 may be any suitable image for the user interface 600, as described herein. For example, the image 622 may have been a smaller image that was expanded to cover more area of a user interface and did not have adequate pixel density to be expanded to the size of the layer 620, such as the final image 530 of FIG. 5. In another example, the image 622 may be a foreground element, as described below.

The image 622 may not blend in with a background color of the user interface 600 and may pull a user out of an immersive experience of the user interface 600. Because of this, a layer 610 may be created with one or more border colors or gradients 612 to help blend the image 622 with the background. In alternative embodiments, the layer 620 may be directly populated with the one or more border colors or gradients 612, and the layer 610 may not need to be created. Such a border color or gradient 612 may be a color of a background of the user interface 600. For example, if the background color is black, both border colors 612 may be solid black. In another example with a black background color, both gradients 612 may transition from transparent to black. If a background image is used, the color of the background image of the user interface 600 may be automatically determined by an interface creator, such as the interface creator 130, to determine what color or colors the border color or gradient 612 should include. Any feasible method of determining color may be used, such as sampling pixels of an image. In an example, if an image of outer space is used as a background image, the interface creator may determine the background color to be black. Thus, the interface creator may create a black border color 612 or may create a gradient from transparent to black to use as the gradient 612 for the top and bottom of the image 622. A color of the edges of the image 622 may also be automatically determined to create a gradient from the color of the digital asset to the color of the background image. In an example, if the image 622 has a desert on the bottom of the image 622 and a sky on the top of the image 622, the interface creator may determine the bottom edge of the image to be yellow and the top of the image to be blue. Assuming the same outer space background, the interface creator may create a gradient from yellow to black for the bottom gradient 612 and a gradient from blue to black for the top gradient 612.

The bounds of the border color or gradient 612 should match the edges of the image 622, meaning that if the border color or gradient 612 was placed on the same layer (layer 620) as the image 622, the edges of the border color or gradient 612 may line up with or slightly overlap the edges of the image 622. The layer 610 may be placed in front of the layer 620 so that the border color or gradient 612 appears to cover or line up with the edges of the image 622. Such a placement may better transition the image 622 to a background of the user interface 600 from the perspective of a user.

Virtual planes, layers, and templates may be defined to serve specific purposes in a user interface. For example, a content aggregator 140 may use a standardized user interface configuration so that it may present content items to consumers in a uniform manner. In an example, each user interface may have a user-interface (UI) layer, a title layer, a foreground element layer, and a panorama layer. Using a standardized configuration of virtual planes, layers, and templates allows an interface creator 130 to provide content providers 110 with templates to shape and size digital assets to minimize edits performed by the interface creator 130.

The UI layer is the layer closest to the user and may contain a digital asset associated with the content item that easily identifies the content item, such as a movie poster. The UI layer may include controls for the user to interact with the content item, such as a play button for a movie, an episode selection mechanism for a TV show, a search field, or any other element allowing user manipulation. The digital assets of the UI layers of user interfaces collected at the content aggregator 140 may be used in a selection interface of the content aggregator 140 to allow a user to quickly view available content items, such as a scrolling grid of selectable movie posters when using a movie streaming service. In such a selection interface, user selection of a digital asset may send the user to the user interface created by the interface creator 130 for the content item the digital asset is associated with. An example UI layer may be the layer 210 of FIG. 2.

The title layer lies on a virtual plane behind that of the UI layer and may contain a digital asset identifying the content item, such as a logo or simply text. If no digital asset is supplied for the title layer, text describing the content item may be automatically generated for this layer, such as the name of the content item, movie title, game name, or other identifying name. Because the title layer is behind the UI layer, templates for these layers may be situated so that both the UI layer and the title layer are visible to a user. In an example, the UI layer may use a template such as the template 400 and may have a reserved transparent area on the left side of the layer, such as reserved transparent area 420. An example title layer may be the layer 220 of FIG. 2.

The foreground element layer lies on a virtual plane behind the title layer and may contain a digital asset that is meant to be a main point of interest in the user interface and highlight information about the content item to the user; this digital asset is referred to as a "foreground element." In an example, a foreground element for a movie may be larger and more prominent than the digital assets in the UI layer and title layer and may display characters or an action event in the movie. The foreground element layer may also house any 3D models, such as the model 222, or other prominent digital assets received by the interface creator 130. An example foreground element layer may be the layer 230 of FIG. 2.

The panorama layer lies on a virtual plane behind the UI layer, the title layer, and the foreground element layer and may be the back-most layer of the user interface. The panorama layer may contain a digital asset to create a background for the user interface, such as a panorama. For example, in a 3D environment, the panorama layer may contain an image of space to create an immersive space experience for the user. In an example, the panorama layer may contain an image that has been edited in accordance with one or more of the editing methods described above, such as enlarging, cropping, blurring, adding one or more gradients, etc., to create a seamless background for the user interface. The background image or pattern may be a panorama in that it provides a user with a wide angle or 360 degree view of the subject of the image or pattern and may surround the user. An example panorama layer may be the layer 240 of FIG. 2.

By using a standardized configuration such as a UI layer, a title layer, a foreground element layer, and a panorama layer, an interface creator 130 may be able to publish its configuration to a content provider 110 for ease of use. For example, with the described configuration, a content provider 110 may be used to create a digital asset for each layer and meet each layer's template requirements. The content provider 110 may then send these digital assets to the interface creator 130 for automated creation of a user interface.

Figure 7:
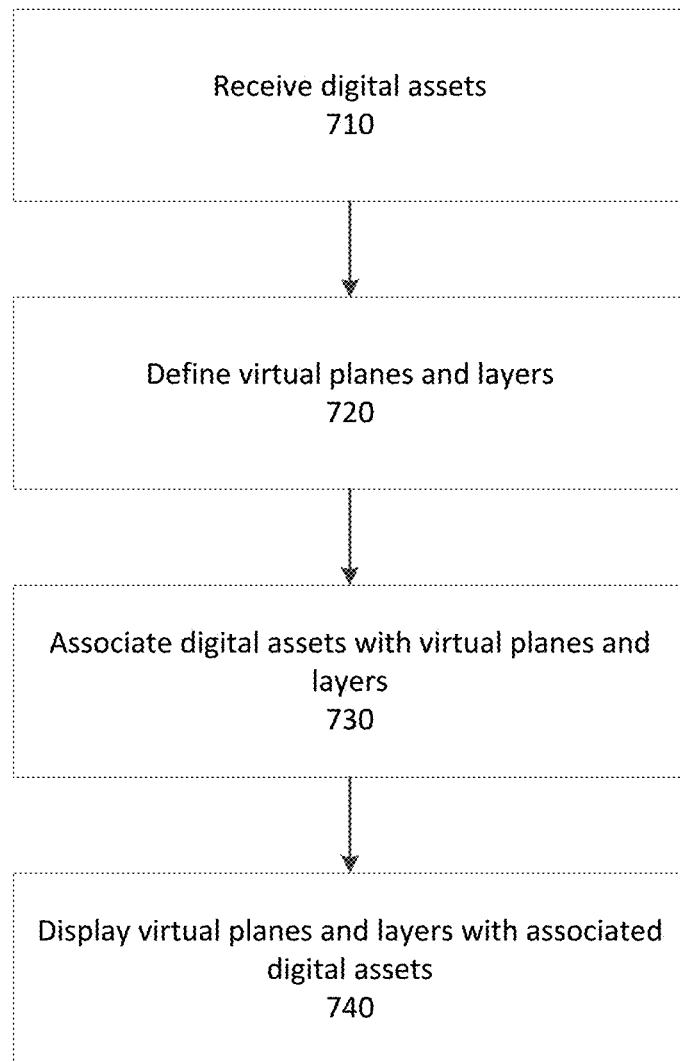
FIG. 7 is a flow diagram depicting an example method for creating a user interface.

FIG. 7 is a flow diagram depicting an example process for creating a user interface with the interface creator 130. Although FIG. 7 is depicted as a sequence of blocks, the depicted sequence should not be construed as limiting the scope of the present disclosure. In various cases, aspects, and embodiments, the blocks and described operations may be altered, omitted, reordered, or performed in parallel. For purposes of illustration, reference is made to the network described in connection with FIG. 1, although any suitable network and systems may be used to implement the described processing.

At block 710, the interface creator 130 may receive digital assets associated with a content item. The digital assets may be sent by a content provider 110, be available from previous transactions or interfaces, be available from a generic library of digital assets such as ambient effects or stock images and environments, be interactive digital assets such as social media feeds or user-interactive elements, or any combination thereof.

At block 720, the interface creator 130 may define virtual planes and layers for display of the digital assets. The virtual planes and layers may be defined based on a default configuration scheme, the number of digital assets received, or by a user. The virtual planes and layers may be the UI layer, title layer, foreground element layer, and panorama layer described above. The layers may have templates associated with them for automatic formatting and display of the digital assets.

At block 730, the interface creator 130 may associate the digital assets with the defined virtual planes and layers, completing the user interface. Associating the digital assets with the virtual planes and layers may involve editing or degrading the digital assets in accordance with templates associated with the layers, including resizing, cropping, blurring, and adding gradients, as described above.

At block 740, the completed user interface may be displayed, or output for display, to a user for interaction and may be aggregated with one or more user interfaces in the content aggregator 110 to create a catalogue of content for user selection and interaction. The user interface may be 2D or 3D and may have the ability to dynamically adapt dimensions to a user device to accessing the user interface. If the user interface is displayed in a 3D environment, a user may move through the environment and interact with the digital assets. If the user interface is created in a 3D environment and is being displayed in a 2D environment, the layers may flatten into fewer virtual planes, but may keep depth characteristics such as perspective and parallax effects.

Figure 8:
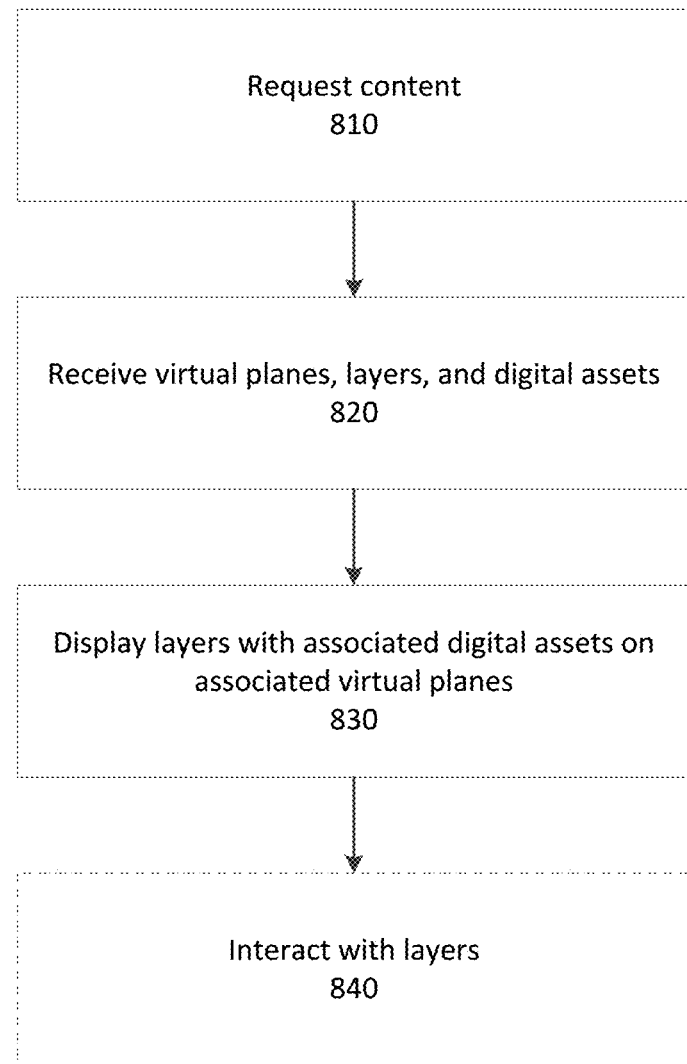
FIG. 8 is a flow diagram depicting an example process for receiving and displaying a user interface.

FIG. 8 is a flow diagram depicting an example process for receiving and displaying a user interface with a user device, such as one of the user devices 170. Although FIG. 8 is depicted as a sequence of blocks, the depicted sequence should not be construed as limiting the scope of the present disclosure. In various cases, aspects, and embodiments, the blocks and described operations may be altered, omitted, reordered, or performed in parallel. For purposes of illustration, reference is made to the network described in connection with FIG. 1, although any suitable network and systems may be used to implement the described processing.

At block 810, the user device may request content from a content aggregator, such as the content aggregator 140. Such a request may be of any suitable form and may comprise a request for a content item, such as a movie or TV show. For example, a VR headset may request to watch a movie from a communicatively connected set top box. In another example, a smartphone may request to access a TV show via a web interface.

At block 820, the user device may receive virtual planes, layers, and digital assets associated with the content item. Before being able to display, or output for display, a user interface such as those described herein, the user device may need to download or otherwise receive parts of the user interface. For example, after requesting to watch a movie, which has a user interface such as that seen in FIG. 2, a VR headset may receive the title image 212, the model 222, layers 210, 220, 230, and 240, and virtual planes 250, 260, 270, and 280.

At block 830, the user device may display, or output for display, the received layers with their associated digital assets on the associated virtual planes. For example, after receiving the user interface data of FIG. 2, the VR headset may populate the layers with their digital assets and display the layers on their associated virtual planes. The VR headset may then display these layers to the user via an integrated display. These displayed layers comprise the user interface.

At block 840, the user device may optionally interact with the displayed layers. After displaying the user interface to a user, the user may interact with the user interface, as described herein. For example, a VR headset may enable a user to view and manipulate digital assets in the displayed user interface. The VR headset may provide various perspectives of the user interface and may allow the user to select and view the content item associated with the user interface.

Figure 9:
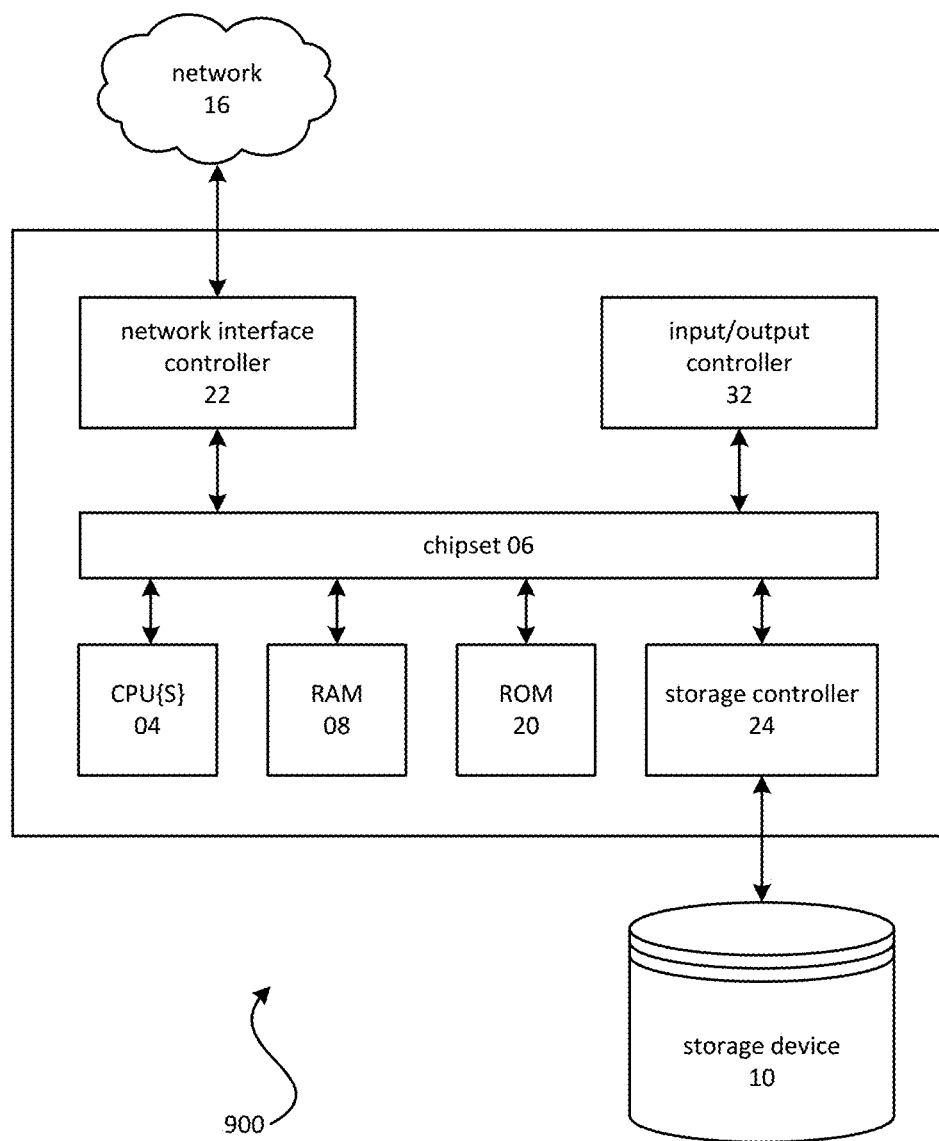
FIG. 9 depicts an example computing system.

FIG. 9 depicts an example computing device in which various components described herein may be embodied, such as any of the various devices depicted in FIG. 1. The computer architecture shown in FIG. 9 may correspond to a set-top box, remote control device, home automation system, desktop computer, laptop, tablet, network appliance, e-reader, smartphone, the content provider 110, the interface creator 130, the content aggregator 140, the user devices 170, or other computing device, and may be utilized to execute any aspects of the components described herein, such as to implement the operating procedures of FIG. 5, 7, or 8, or aid in the creation of any of the user interfaces of FIGS. 2-4 and 6.

A computing device 900 may include a baseboard, or "motherboard," which is a printed circuit board to which a multitude of components or devices may be connected by way of a system bus or other electrical communication paths. One or more central processing units ("CPUs") 04 may operate in conjunction with a chipset 06. The CPU(s) 04 may be standard programmable processors that perform arithmetic and logical operations necessary for the operation of the computing device 900.

The CPU(s) 04 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 04 may, in various embodiments, be augmented with or replaced by other processing units, such as GPU(s) (not shown). GPU(s) may comprise processing units specialized for, but not necessarily limited to, highly parallel computations, such as graphics and other visualization-related processing.

A chipset 06 may provide an interface between the CPU(s) 04 and the remainder of the components and devices on the baseboard. The chipset 06 may provide an interface to a random access memory ("RAM") 08 used as the main memory in the computing device 900. The chipset 06 may further provide an interface to a computer-readable storage medium, such as a read-only memory ("ROM") 20 or non-volatile RAM ("NVRAM") (not shown), for storing basic routines that may help to start up the computing device 900 and to transfer information between the various components and devices. The ROM 20 or NVRAM may also store other software components necessary for the operation of the computing device 900 in accordance with the aspects described herein.

The computing device 900 may operate in a networked environment using logical connections to remote computing nodes and computer systems through a local area network ("LAN") 16. The chipset 06 may include functionality for providing network connectivity through a network interface controller (NIC) 22, such as a gigabit Ethernet adapter. The NIC 22 may be capable of connecting the computing device 400 to other computing nodes over the network 16. It should be appreciated that multiple NICs 22 may be present in the computing device 900, connecting the computing device to other types of networks and remote computer systems.

The computing device 900 may be connected to a mass storage device 10 that provides non-volatile storage for the computing device 900. The mass storage device 10 may store system programs, application programs, other program modules, and data, used to implement the processes and systems described in greater detail herein. The mass storage device 10 may be connected to computing device 900 through a storage controller 24 connected to the chipset 06. The mass storage device 10 may consist of one or more physical storage units. A storage controller 24 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 900 may store data on the mass storage device 10 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 10 is characterized as primary or secondary storage and the like.

For example, the computing device 900 may store information to the mass storage device 10 by issuing instructions through the storage controller 24 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 900 may further read information from the mass storage device 10 by detecting the physical states or characteristics of one or more particular locations within the physical storage units.

In addition to the mass storage device 10 described above, the computing device 900 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 900.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that can be used to store the desired information in a non-transitory fashion.

The mass storage device 10 may store an operating system utilized to control the operation of the computing device 900. For example, the operating system may comprise a version of the LINUX operating system. In another example, the operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized in some embodiments. It should be appreciated that other operating systems may also be utilized. The mass storage device 10 may store other system or application programs and data utilized by the computing device 900.

The mass storage device 10 or other computer-readable storage media may also be encoded with computer-executable instructions, which, when loaded into the computing device 900, transforms the computing device from a general-purpose computing system into a special-purpose computer capable of implementing the aspects described herein. These computer-executable instructions transform the computing device 900 by specifying how the CPU(s) 04 transition between states, as described above. The computing device 900 may have access to computer-readable storage media storing computer-executable instructions, which, when executed by the computing device 900, may perform operating procedures depicted in FIG. 5, 7, or 8, or aid in the creation of any of the user interfaces of FIGS. 2-4 and 6.

The computing device 900 may also include an input/output controller 32 for receiving and processing input from a number of input devices, such as a keyboard, a mouse, a touchpad, a touch screen, an electronic stylus, or other type of input device. Similarly, the input/output controller 32 may provide output to a display, such as a computer monitor, a flat-panel display, a digital projector, a printer, a plotter, or other type of output device. It will be appreciated that the computing device 900 may not include all of the components shown in FIG. 9, may include other components that are not explicitly shown in FIG. 9, or may utilize an architecture completely different than that shown in FIG. 9.

As described herein, a computing node may be a physical computing device, such as the computing device 900 of FIG. 9. A computing node may also include a virtual machine host process and one or more virtual machine instances operating on a physical computing device, such as the computing device 900. Computer-executable instructions may be executed by the physical hardware of a computing device indirectly through interpretation and/or execution of instructions stored and executed in the context of a virtual machine.

Applicant has described methods and systems for the creation of adaptive user interfaces that may be automatically created. It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the described methods and systems. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all methods and systems. This applies to all aspects of this application including, but not limited to, operations in disclosed methods. Thus, if there are a variety of additional operations that can be performed it is understood that each of these additional operations can be performed with any specific embodiment or combination of embodiments of the disclosed methods.

The present methods and systems may be understood more readily by reference to the aforementioned detailed description of preferred embodiments and the examples included therein and to the figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-executable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described above with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the disclosed embodiments may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations can be made without departing from the scope or spirit of the present disclosure. Other embodiments will be apparent to those skilled in the art from consideration of the specification and practices described. It is intended that the specification and example figures be considered as exemplary only, with a true scope and spirit being indicated by the following claims.

The invention claimed is:

1. A non-transitory computer-readable medium storing instructions that, when executed, cause:
    receiving at least a first digital asset and a second digital asset, each of the first digital asset and the second digital asset being associated with a content item;
    determining at least a first virtual plane associated with the first digital asset and a second virtual plane associated with the second digital asset, wherein the first virtual plane is associated with a first depth and a first template, and wherein the second virtual plane is associated with a second depth and a second template; and
    causing output of a user interface comprising a first digital asset output in the first virtual plane and a second digital asset output in the second virtual plane.

2. The non-transitory computer-readable medium of claim 1, wherein the instructions, when executed, further cause:
    degrading the first digital asset to disguise distortion associated with the first digital asset.

3. The non-transitory computer-readable medium of claim 1, wherein the first template comprises attributes to facilitate automated formatting of the first digital asset.

4. The non-transitory computer-readable medium of claim 1, wherein the instructions, when executed, further cause:
    adding a gradient to a top of the first digital asset, a bottom of the first digital asset, or both.

5. The non-transitory computer-readable medium of claim 1, wherein the instructions, when executed, further cause:
    adding a gradient to the first digital asset, wherein one or more colors of the gradient are determined by one or more colors of the first digital asset and a background.

6. The non-transitory computer-readable medium of claim 1, wherein the second virtual plane is positioned in front of the first virtual plane.

7. The non-transitory computer-readable medium of claim 1, wherein the instructions, when executed, further cause:
    determining whether the first digital asset or the second digital asset is distorted.

8. The non-transitory computer-readable medium of claim 1, wherein the first template comprises one or more bounds for a size of the first digital asset.

9. The non-transitory computer-readable medium of claim 1, wherein at least one of the first digital asset and the second digital asset comprise at least one of: a name of the content item; an image of the content item; a three-dimensional virtual object representing an object of the content item; a snippet of video of the content item; cover art identifying the content item; a poster identifying the content item; one or more social media feeds about the content item; an interactive element for manipulation of the content item; a description of the content item; and a relation to a subject of the content item.

10. A device comprising:
    one or more processors; and
    memory storing instructions that, when executed by the one or more processors, cause the device to:

receive at least a first digital asset and a second digital asset, each of the first digital asset and the second digital asset being associated with a content item;

determine at least a first virtual plane associated with the first digital asset and a second virtual plane associated with the second digital asset, wherein the first virtual plane is associated with a first depth and a first template, and wherein the second virtual plane is associated with a second depth and a second template; and cause output of a user interface comprising a first digital asset output in the first virtual plane and a second digital asset output in the second virtual plane.

11. The device of claim 10, wherein the instructions, when executed, further cause the device to:

degrade the first digital asset to disguise distortion associated with the first digital asset.

12. The device of claim 10, wherein the instructions, when executed, further cause the device to:

add a gradient to a top of the first digital asset, a bottom of the first digital asset, or both.

13. The device of claim 10, wherein the instructions, when executed, further cause the device to:

add a gradient to the first digital asset, wherein one or more colors of the gradient are determined by one or more colors of the first digital asset and a background.

14. The device of claim 10, wherein the instructions, when executed, further cause the device to:

determine whether the first digital asset or the second digital asset is distorted.

15. The device of claim 10, wherein the first template comprises one or more bounds for a size of the first digital asset.

16. A non-transitory computer-readable medium storing instructions that, when executed, cause:

receiving a plurality of digital assets associated with a content item;

receiving interface data comprising a plurality of layers, each of the plurality of layers being associated with a respective digital asset template and a respective depth;

formatting each of the plurality of digital assets in accordance with the respective digital asset template; and causing output of a user interface comprising formatted digital assets, the formatted digital assets comprising a first digital asset output in a first virtual plane and a second digital asset output in a second virtual plane.

17. The non-transitory computer-readable medium of claim 16, wherein the instructions, when executed, further cause:

receiving a request to display another user interface associated with the content item, the request including a two-dimensional environment for display; and causing, for display, output of the plurality of layers in the two-dimensional environment according to the respective depth of each layer of the plurality of layers.

18. The non-transitory computer-readable medium of claim 16, wherein the instructions, when executed, further cause:

receiving a request to display another user interface associated with the content item, the request including a three-dimensional environment for display; and causing, for display, output of the plurality of layers in the three-dimensional environment according to the respective depth of each layer of the plurality of layers.

19. The non-transitory computer-readable medium of claim 18, wherein the three-dimensional environment is a virtual reality environment.

20. The non-transitory computer-readable medium of claim 16, wherein the formatting comprises at least one of: cropping, resizing, blurring, adding a gradient, or any combination thereof.

* * * * *